United States Patent [19]

Okada et al.

[11] 4,426,661
[45] Jan. 17, 1984

[54] TELEVISION RECEIVER INCLUDING A CIRCUIT FOR DOUBLING LINE SCANNING FREQUENCY

[75] Inventors: Takashi Okada; Yutaka Tanaka, both of Yokohama, Japan

[73] Assignee: Sony Corporation, Tokyo, Japan

[21] Appl. No.: 330,943

[22] Filed: Dec. 15, 1981

[30] Foreign Application Priority Data

Dec. 26, 1980 [JP] Japan .................. 55-189301

[51] Int. Cl.³ .............................................. H04N 5/02
[52] U.S. Cl. .................................................. 358/140
[58] Field of Search .................................. 358/11, 140

[56] References Cited

FOREIGN PATENT DOCUMENTS 2000413 1/1979 United Kingdom ................. 358/140

OTHER PUBLICATIONS

Van Buul et al.–Standards Conversion of a Videophone Signal with 313 Lines into a TV Signal with 625 Lines–Phillips Research Reports, vol. 29, #5, pp. 413–428, Oct. 1974.

Primary Examiner—Joseph A. Orsino, Jr.
Attorney, Agent, or Firm—Hill, Van Santen, Steadman & Simpson

[57] ABSTRACT

In a television receiver including a circuit for doubling line scanning frequency according to the present invention, a double scanning is performed so that a first signal or a second signal is alternately selected at every H/2 (H; normal horizontal scanning period). The first signal was converted from a video signal into a double line scanning frequency, and the second signal was converted into a double line scanning frequency from a signal produced by delaying the video signal by one field period. With such a double scanning television receiver, pictures of high quality may be obtained without flickering and degradation in resolution.

1 Claim, 5 Drawing Figures

TELEVISION RECEIVER INCLUDING A CIRCUIT FOR DOUBLING LINE SCANNING FREQUENCY

BACKGROUND OF THE INVENTION

1. Field of the Invention

The present invention relates to a television receiver including a circuit for doubling the line scanning frequency.

2. Description of the Prior Art

A double scanning television receiver is conventionally known which doubles the normal number of the scanning lines for one field by scanning twice each of the scanning lines having the same picture content. With such a double scanning television receiver, the flickering on the screen may be eliminated and the apparent resolution may be improved, so that pictures of high quality may be obtained. Although various double scanning television receivers have been proposed, they are generally complex in circuit configuration and are technically difficult to realize. In a conventional double scanning television receiver of this type, within each frame, double scanning is performed using scanning lines for two fields of the frame. Therefore, the image is distorted with the transition from one frame to another frame. Stepped portions tend to be formed on a line, especially when the obliquely extending line or an object moving on this line is displayed. This phenomenon is emphasized in case of a large screen.

OBJECTS AND SUMMARY OF THE INVENTION

Accordingly, it is an object of this invention to provide an improved television receiver designed so as to perform the transition of images smoothly.

It is another object of this invention to provide an improved television receiver designed so as to eliminate the flickering on the screen.

It is a further object of this invention to provide an improved television receiver designed so as to obtain the pictures of high quality.

In accordance with an aspect of the present invention, there is provided a television receiver comprising: a video signal input terminal supplied with an input video signal; first converter means connected to the video signal input terminal for converting the input video signal to a first converted signal of a double line scanning frequency; and a first converted video signal output terminal; characterized by a delay circuit connected to the video signal input terminal for delaying the input video signal by one field; second converter means connected to the delay circuit for converting the output signal from the latter to a second converted signal of a double line scanning frequency; and signal selecting means connected to the first and second converter means for selecting the first and second converted signals alternately at every H/2 (H: normal horizontal scanning period) and for supplying the same to the first converted video signal output terminal.

The above and other objects, features and advantages of this invention will become apparent from the ensuing description of illustrative embodiments thereof, which is to be read in conjunction with the drawings.

DETAILED DESCRIPTION OF THE PREFERRED EMBODIMENTS

Figure 1:
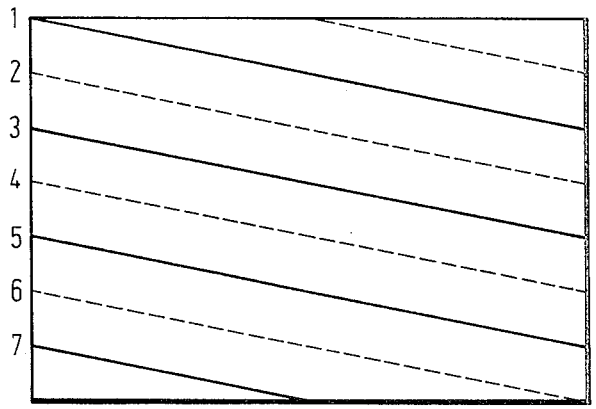
FIG. 1 is a view showing a television screen for the normal interlaced scanning.

According to the present invention, the scanning line of the current field and the scanning line of the immediately preceding field are used for double scanning in the current scanning, and this procedure is repeated. When the fields are in the order of A, B, C, D and so on, the respective fields have the information contents according to the combinations of AB, BC, CD, DE and so on. In this manner, the information changes in the order of fields, so that the transition of images may be performed smoothly. FIG. 1 shows a screen where the normal interlaced scanning is performed with seven scanning lines. Scanning lines 1, 3, 5 and 7, indicated by solid lines, correspond to a first field. Scanning lines 2, 4 and 6, indicated by dotted lines, correspond to a second field. The latter half of the sccanning line 7 is scanned in the second field.

Figure 2:
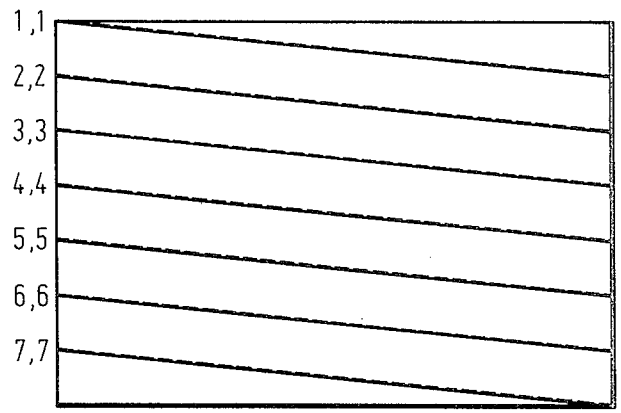
FIG. 2 is a view of a television screen according to the first embodiment of the present invention.
Figure 3:
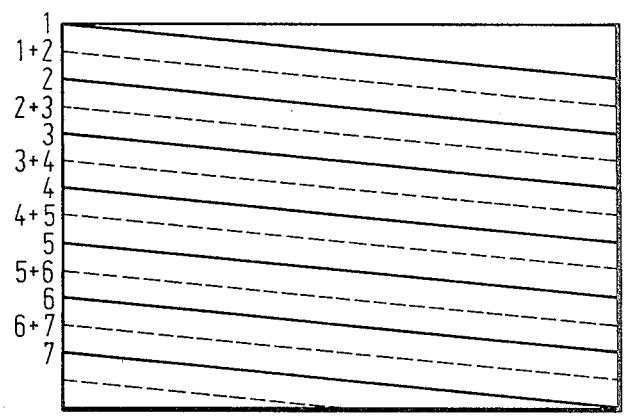
FIG. 3 is a view of a television screen according to the second embodiment of the present invention.

FIG. 2 shows a first embodiment of the present invention, and FIG. 3 shows a second embodiment of the present invention. In the embodiment shown in FIG. 2, double scanning is performed by non-interlaced scanning, wherein the scanning lines of the first field and the scanning lines of the second field coincide with substantially the same contents. In the embodiment shown in FIG. 3, double scanning is performed by interlaced scanning wherein the scanning line of the second field has half each of the information of the immediately preceding and following scanning lines of the first field.

Figure 4:
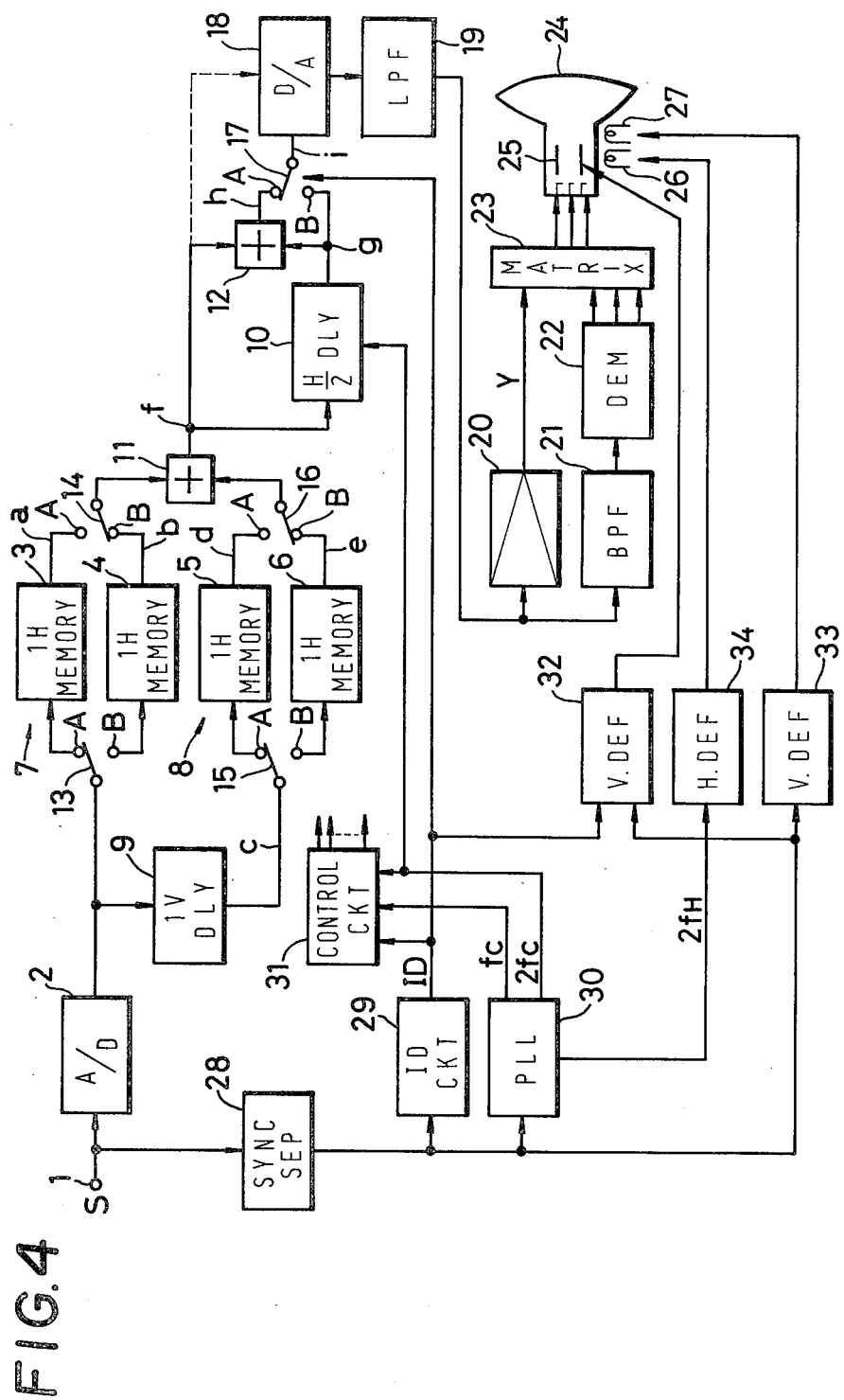
FIG. 4 is a circuit diagram showing an example of the circuit configuration for practicing the first and second embodiments according to the present invention.

FIG. 4 shows an example of the circuit configuration for performing double scanning shown in FIGS. 2 and 3.

In the circuit shown in FIG. 4, a video signal S supplied to an input terminal 1 is converted to a digital video signal at an A/D converter 2. The digital video signal is converted by a double scanning frequency converting circuit 7. A signal obtained by delaying the digital video signal by one field at a 1V (V: vertical scanning interval) delay circuit 9 is converted by a double scanning frequency converting circuit 8. The output signals from the double scanning frequency converting circuits 7 and 8 are added at an adder 11, the output signal of which is obtained at point f. The double scanning by non-interlaced scanning as shown in FIG. 2 is perfomed according to the signal obtained at point f. In this case, the signal at point f is directly supplied to a D/A converter 18, as shown by dotted lines in FIG. 4.

On the other hand, the double scanning by interlaced scanning as shown in FIG. 3 is performed in the following manner. The signal at point f is delayed at a H/2 delay circuit 10. The signal at point f and the signal delayed by the H/2 delay circuit 10 are added by an adder 12, the output signal of which is obtained at point h. The signal at spot h or the delayed signal is selected by a switch 17 and the selected signal is obtained at point i. The double scanning by interlaced scanning in FIG. 3 is performed on the basis of the signal at point i.

The double scanning frequency converting circuit 7 consists of two 1H memories 3 and 4 and two switches 13 and 14. The memories 3 and 4 are so constructed that the signal of 1H is written and then the written signal is read out at a double speed, and while one memory writes, the other memory reads out. Contacts A and B of the switches 13 and 14 are switched in opposite directions at every 1H. The double scanning frequency converting circuit 8 consists of two memories 5 and 6 and two switches 15 and 16, and operates in the same manner as the double scanning frequency converting circuit 7. The memories 3, 4, 5 and 6, the 1V delay circuit 9, and the H/2 delay circuit 10 may comprise, for instance, BBDs or CCDs. The memories 3, 4, 5 and 6 comprise, for instance, 910-bit memories. In this case, the writing clock frequency is 14 MHz, and the reading clock frequency is 28 MHz.

Figure 5:
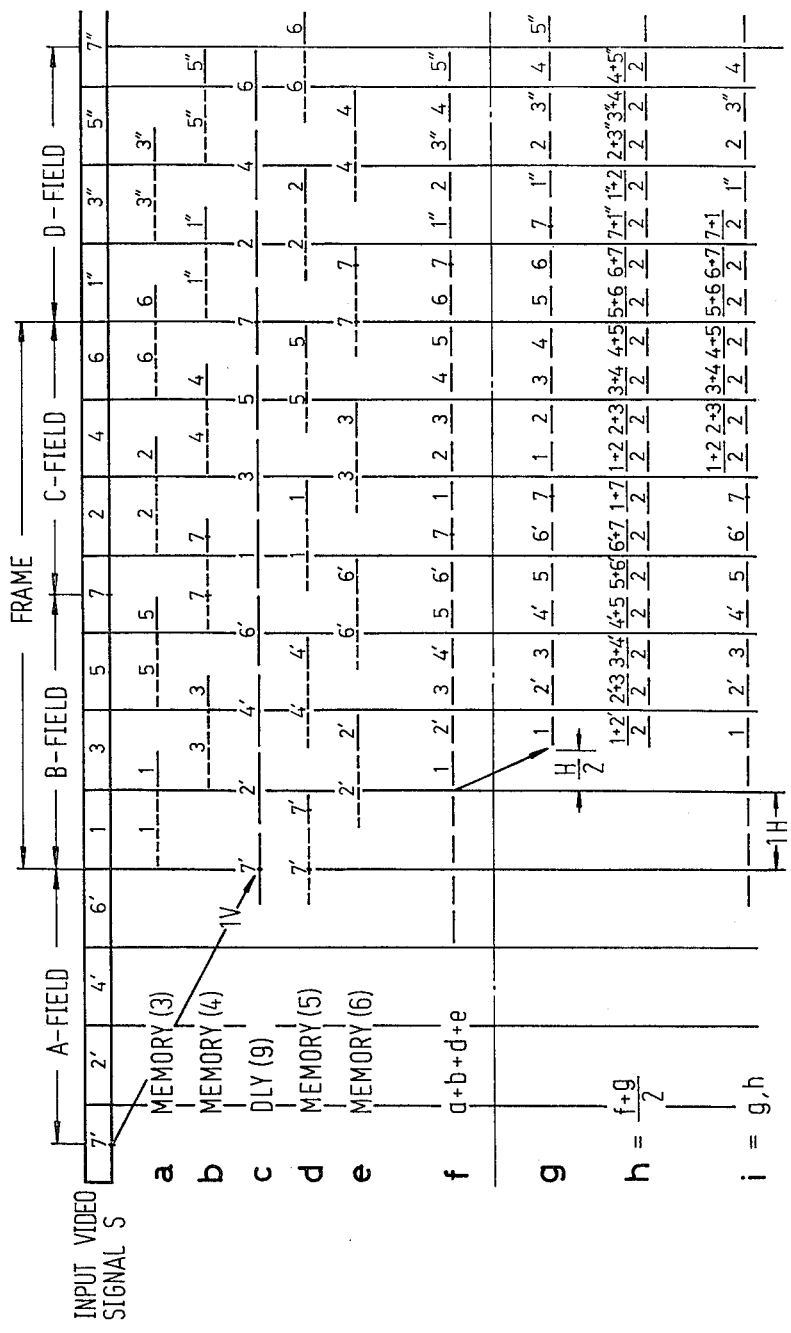
FIGS. 5a to 5i are timing charts of the signals for explaining the mode of operation of the circuit shown in FIG. 4.

The video signals S of the fields A, B, C, D, and so on, as shown in FIG. 5 are supplied to the input terminal 1. In FIG. 5, the scanning lines or the signals of the scanning lines for the respective fields A, B, C, D, and so on, are denoted by [7', 2', 4', 6']; [1, 3, 5, 7]; [7, 2, 4, 6]; and [1", 3", 5", 7"] ('7' denotes half of the scanning line), respectively. The video signal S is supplied to the A/D converter 2 as well as a synchronizing separator circuit 28 for extraction of horizontal and vertical synchronizing signals. These synchronizing signals are supplied to a control circuit 31, a field identification circuits 29, a PLL circuit 30, and vertical deflection circuits 32 and 33. The field identification circuit 29 generates an identification signal ID, the level of which is inverted for every field. This signal ID is supplied to the control circuit 31 and switches the contacts A and B of the switch 17 at every 1V. The PLL circuit 30 generates a signal of frequency $f_C$ (e.g., 14 MHz) and a signal of frequency $2f_C$, which are supplied to the control circuit 31. The PLL circuit 30 also generates a signal of frequency $2f_H$ (where $f_H$ is the horizontal scanning frequency of, for example, 15.75 kHz) which is supplied to a horizontal deflection circuit 34. The signals of frequency $2f_C$ are also used as the clocks for the delay circuit 10. Based on the synchronizing signals, the signal ID, and the signals of frequencies $f_C$ and $2f_C$, the control circuit 31 produces the writing and readout clocks for the memories 3 to 6, the switching signals for the switches 13 to 16, and other necessary clock pulses and outputs them at predetermined timings. In order to shift the scanning lines indicated by the dotted lines in FIG. 3 upward or downward by a predetermined distance from the scanning lines indicated by the solid lines in FIG. 3, when performing the double scanning by interlaced scanning as shown in FIG. 3, the vertical deflection circuit 32 produces a voltage which changes the vertical deflection level in the field interval indicated by the dotted lines, based on the vertical synchronizing signal and the signal ID. This voltage is applied to an electrode 25 of a cathode-ray tube 24. The vertical deflection circuit 33 applies a vertical deflection voltage to a vertical deflection coil 27, and the horizontal deflection circuit 34 applies a horizontal deflection voltage of frequency $2f_H$ to a horizontal deflection coil 26.

The signal obtained at point f or i is converted to an analog double scanning video signal by a D/A converter 18, which is supplied to a Y signal amplifier 20 and a band-pass filter 21 through a low-pass filter 19. A chroma signal obtained from the band-pass filter 21 is supplied to a color demodulation circuit 22 which outputs a color difference signal. This color difference signal and the Y signal from the amplifier 20 are supplied to a matrix circuit 23 to provide signals of three primary colors R, G and B. These three primary color signals are supplied to the respective cathodes of the cathode-ray tube 24.

Referring to FIG. 5, the writings in the memories 3 to 6 and the 1V delay circuit 9 are indicated by the dotted lines under the respective reference numerals. The readouts are indicated by the solid lines under the respective numerals. Therefore, the output signals at points a, b, d, and e are indicated by the numerals on the solid lines during H/2 interval.

The A/D converter video signal is converted to a signal of double scanning frequency at the converting circuit 7, and is also converted to a signal of double scanning frequency at the converting circuit 8 through the 1V delay circuit 9. The signals obtained at points a, b, d, and e are added at the adder 11, and the signals are obtained at point f in the order shown in FIG. 5. The double scanning by non-interlaced scanning as shown in FIG. 2 is performed by supplying these signals to the D/A converter 18. The signal at point f is supplied to the adder 12, and then is supplied through the H/2 delay circuit 10 to the adder 12 and the contact B of the switch 17. The signals are obtained at point i in the order shown in FIG. 5 since the switch 17 selects the signal at point h and the signal at spot g at every 1V. The signals at point i are supplied to the D/A converter 18 to perform the double scanning by interlaced scanning as shown in FIG. 3.

Although specific embodiments of this invention have been described hereinabove with reference to the accompanying drawings, it is to be understood that this invention is not limited to those precise embodiments, and that various changes and modifications may be effected therein by one skilled in the art without departing from the scope or spilit of the invention as defined in the appended claims.

What is claimed is:

1. A television receiver comprising, a video signal input terminal supplied with an input video signal, first converter means connected to said video signal input terminal for converting said input video signal to a first converted signal of a double line scanning frequency, a first converted video signal output terminal, second converter means including a field delay circuit and connected to said video signal input terminal for converting said input video signal to a second converted signal of a double line scanning frequency wit one field delay, first signal selecting means connected to said first and second converter means for selecting said first and second converted signals alternately at every H/2 (where H: normal horizontal scanning period) and for supplying the same to said first converted video signal output terminal, a horizontal deflection circuit connected to said video signal input terminal for providing a horizontal current of said double line frequency, a vertical deflection circuit connected to said video signal input terminal for providing a vertical current, and a cathode ray tube having horizontal and vertical deflection means connected to said horizontal and vertical deflection circuits for being supplied with said horizontal and vertical deflection currents respectively, characterized in combination of an additional delay circuit of H/2 connected to said first converted video signal output terminal, a signal adder connected between said first converted video signal output terminal and said additional delay circuit, a field identification circuit connected to said video signal input terminal for identifying odd and even fields of said input video signal, second signal selecting means controlled by said field identification circuit for selecting the signal from said signal adder and the output signal from said additional delay circuit alternately in correspondence with said identified odd and even fields, a second converted video signal output terminal connected to said second signal selecting means, signal processing means connected to said second converted video signal output terminal for supplying the signal thereat to said cathode ray tube, and means connected between said field identification circuit and said vertical deflection circuit for shifting the vertical deflection by a predetermined amount during one of odd and even fields such that an interlaced scanning of double line frequency is performed in said cathode ray tube.

* * * * *